Patented Oct. 9, 1923.

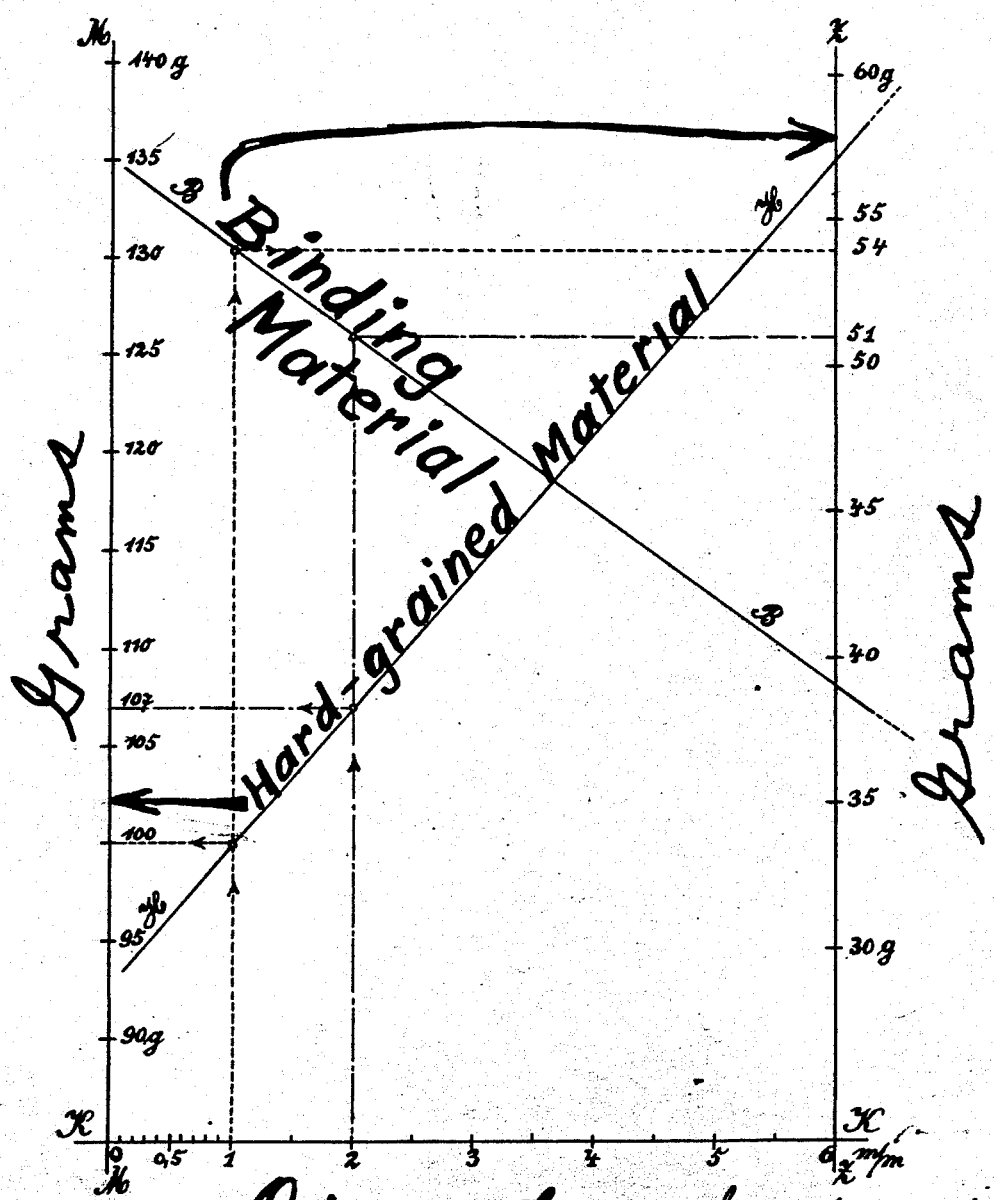

1,470,378

UNITED STATES PATENT OFFICE.

ADOLF KLEINLOGEL, OF DARMSTADT, GERMANY.

METHOD OF MANUFACTURING ARTIFICIAL BUILDING MATERIALS.

Application filed December 5, 1921. Serial No. 519,887.

*To all whom it may concern:*

Be it known that I, ADOLF KLEINLOGEL, a citizen of the German Republic, and residing at Darmstadt, Germany, have invented certain new and useful Improvements in a Method of Manufacturing Artificial Building Materials, of which the following is a specification.

My invention relates to an improved method of manufacturing artificial building-materials and to the products thereby obtained, independent of the use of said products for constructing walls or any other parts of constructions, or for coating or covering purposes.

The art of making artificial stones from a mixture of Portland cement and metallic or other hard-grained substances, combined with water, is generally known, but it is also known, that such artificial stones and building-materials are objectionable inasmuch, as their resistance against outside influences of a mechanical or chemical nature is but small and limited in time. Hitherto, it has generally been believed that the size of the grains of hard-grained material admixed was of material influence on the durability of such building-materials. However, after a long series of systematic tests, and studies, the applicant succeeded firstly in discovering that it is not the size of the hard-grained material which controls the durability of such artificial building material and secondly, in definitely establishing by means of a formular and a diagram that the essential importance must be attributed to a precise and definite proportion of the weights of the materials used in the mixture with relation to the size of the metallic parts admixed. A building-material prepared on the basis of this statement not only has shown to acquire a degree of hardness quite out of proportion to that of all other artificial building-materials, but also the durability of the building-material is considerably increased. Another considerable advantage is derived from my invention, consists in the fact that the imperviousness to water is remarkably superior to that which, hitherto, has been obtained by any other process, in such a manner that, according to careful tests the building material produced by my new process will remain impervious to water under a very considerable water pressure.

The proportion by weight of the component materials to be used in preparing my new artificial building-material to the best advantage has been found by me and incorporated in an empirical formula based upon the results of tests.—After having made a large number of test pieces with a variety of proportions by weight and a variety of hard-grained materials of various sizes of their particles, I tested those pieces as to strength, hardness, inertness and imperviousness and plotted the results. By re-plotting separately the proportion by weight and the sizes of particles of hard-grained material of those test pieces which had shown the best results and deriving a mathematical expression for the variables so plotted I obtained my formula which may be explained, as follows:

The formula is based upon the primary size of a particle of hard-grained material of the diameter of 1 mm. The letter "$x$" in the formula denotes the difference in millimeters of the diameter of the particles actually used and those of the primary size 1 mm. diameter. The letter "$H$" denotes the hard-grained material used (such as particles of iron, steel etc.), the letter "$B$" the binding-material (such as Portland cement, mortar, etc.).

The actual size of the particles of $(1 \pm x)$ mm. diameter would require the proportion by weight of the hard-grained material (H) to the binding material (B):

$(100 \pm 7\ x)$ grammes (H) : $(54 \mp 3\ x)$ grammes (B), the upper sign plus or minus having reference to sizes of particles of a diameter above 1 mm. and the lower signs to sizes below 1 mm. diameter.

Example 1.

Supposing that particles of iron of 5 mm. diameter are to be used, the difference between the sizes 5 and 1 mm. will be 4 mm., henceforth $x=4$. The proportion by weight, then will be as follows:

$(100+7 \cdot 4)\ g$ (H) : $(54-3 \cdot 4)\ g$ (B), or 128 $g$ iron-particles : 42 $g$ Portland cement.

Example 2.

Supposing that particles of carborundum of a size of 2 mm. diameter are to be used, then the difference between 2 and 1 mm. is 1 mm., therefore $x=1$. The proportion by weight of the materials to be mixed will be as follows:

(100+7·1) $g$ (H) : (54−3·1) $g$ (B), or 107 $g$ carborundum: 51 $g$ of Portland cement made of blast furnace slag. (B), or, 107 $g$ carborundum: 51 $g$ of Portland cement made of blast furnace slag.

*Example 3.*

Supposing that pulverized particles of steel of a size of 0.3 mm. diameter are to be used in the mixture, the difference in the size of the particles will be 0.7 mm. and, therefore, the value of the $x$ will be 0.7. The proportion by weight of the materials (lower signs), then, will be as follows: (100)−7·0.7) $g$ (H) : 54+3·0.7) $g$ (B), or 95.1 $g$ particles of steel: 56.1 $g$ Portland cement made of blast furnace slag.

In order to give a clear idea of the meaning of the formula derived above and to provide a means for easily computing the quantities required in a given case, various proportions of hard-grained material (H) and of the binding material (B), corresponding to certain sizes of the particles of the hard-grained material (H) according to the formula have been plotted and curves H—H and B—B drawn on the attached chart, in which the horizontal lines, parallel to axis "K," represent the diameters $d$ in millimetres of the particles of the hard-grained material, the values of $d$ having been given along axis "K," while the vertical lines, parallel to axes "M" and "Z" represent the quantities by weight in grammes of the hard-grained material (H) and of the binding material (B), their values having been given along the axes "M" and "Z," corresponding to each value of $d$. If in said formula$\pm(d-l)$ is substituted for "$x$," which may be done according to the definition of "$x$" as given above, the formula may also be written, as follows:

93+7$d$=(H) and 57−3$d$=(B), wherein $d$ denotes the diameter in millimetres of a particle of the hard-grained material, (H) the corresponding quantity of the hard-grained material by weight in grammes, (B) the corresponding quantity of the binding material by weight in grammes.

Substituting the various values of $d$ as marked along axis "K" on the chart, gives the corresponding values of H and B as marked along axes "M" and "Z" in the chart. If all such values of H are marked in the chart in their proper distance from axis "M," above axis "K," and a line is drawn through these points, this line is curve H—H, while if all such values of B are marked in the chart in their proper distance from axis "M," above axis "K," and a line is drawn through these points, this line is curve B—B. The said chart, of course, may be enlarged so as to be of use for any other sizes of particles of hard-grained material. The two curves of said diagram will enable anyone to read from the chart the proportion by weight in grammes of the quantities required, both of the hard-grained material (H) and of the binding-material (B), corresponding to a certain given size of the particles of the hard-grained material.

In the said chart I have indicated by dot-and-dash-lines near the center an example, showing how to find (H) and (B), when the size of the particles of the hard-grained material is supposed to be the same 2 mm.), as was assumed in the fore-going example 2.

All tests, have further shown, that all kinds of Portland cement may be used for the manufacture of such artificial building-materials, but in particular, it has been established, that the acid-resisting Portland cement (made of blast furnace slag, etc.), materially increases the degree of hardness, as well, as the degree of imperviousness and, moreover, that the inertness against chemical influences, obtained thereby, is extraordinarily high.

I claim as my invention:

1. A building material comprising Portland cement and particles of metal and water mixed in a certain proportion by weight, the mixture being made up of (93+7$d$) grammes of metal particles and (57−3$d$) grammes of Portland cement in every (150+4$d$) gramme of the mixture, if $d$ in millimeters denotes the diameter of the metal particles admixed.

2. A building material comprising acid-resisting Portland cement and particles of metal and water mixed in a certain proportion by weight, the mixture being made up of (93+7$d$) grammes of metal particles and (57−3$d$) grammes of Portland cement in every (150+4$d$) gramme of mixture, if $d$ expressed in millimeters denotes the diameter of the metal particles admixed.

3. The method of manufacturing a building material which consists in mixing Portland cement and particles of metal and water in the proportion by weight according to the formula:

Metallic parts in grammes÷Binding-material in grammes = $(100 \pm 7.x) \div (54 \mp 3.x)$. "$x$" denoting the difference in diameter in millimeters of the metal parts actually used and those of a standard particle of 1 millimeter.

In testimony whereof I have affixed my signature.

ADOLF KLEINLOGEL.

Witnesses:
 KARL RUCK,
 WILHELM LEHR.